United States Patent
Roy et al.

(10) Patent No.: US 12,423,712 B2
(45) Date of Patent: Sep. 23, 2025

(54) METHOD AND SYSTEM FOR DATA REGULATIONS-AWARE CLOUD STORAGE AND PROCESSING SERVICE ALLOCATION

(71) Applicant: Tata Consultancy Services Limited, Mumbai (IN)

(72) Inventors: Shubhro Shovan Roy, Kolkata (IN); Pankaj Kumar Sahu, New Delhi (IN); Mangesh Sharad Gharote, Pune (IN); Sachin Premsukh Lodha, Pune (IN); Sutapa Mondal, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 133 days.

(21) Appl. No.: 18/384,004

(22) Filed: Oct. 26, 2023

(65) Prior Publication Data
US 2024/0161125 A1 May 16, 2024

(30) Foreign Application Priority Data
Oct. 31, 2022 (IN) .............................. 202221062016

(51) Int. Cl.
*G06Q 30/018* (2023.01)
*G06F 16/21* (2019.01)

(52) U.S. Cl.
CPC ......... *G06Q 30/018* (2013.01); *G06F 16/214* (2019.01)

(58) Field of Classification Search
None
See application file for complete search history.

(56) References Cited

U.S. PATENT DOCUMENTS 8,239,538 B2 * 8/2012 Zhang ................ H04L 67/1001
718/1
8,782,654 B2 * 7/2014 Jackson ................ G06F 9/5038
718/104

(Continued)

FOREIGN PATENT DOCUMENTS

| EP | 3742292 A1 * | 11/2020 | ........... G06F 9/4881 |
| WO | WO-2019095873 A1 * | 5/2019 | ............. G06F 9/38 |
| WO | WO-2023096701 A2 * | 6/2023 | ........... G06N 3/0464 |

OTHER PUBLICATIONS

Gartner Research. "How to Manage and Optimize Costs of Public Cloud IaaS and PaaS." (Mar. 23, 2020). Retrieved online May 9, 2025. https://www.gartner.com/en/documents/3982411 (Year: 2020).*

(Continued)

*Primary Examiner* — James A Reagan
(74) *Attorney, Agent, or Firm* — Finnegan, Henderson, Farabow, Garrett & Dunner, LLP (57) ABSTRACT

The present disclosure a method for data regulations-aware cloud storage and processing service allocation. Conventional approaches fail to address the technical problem of data placement for storage as well as processing, considering multiple criteria. Further, the conventional approaches fail to address compliance with data regulations, tier pricing policy for multiple Cloud Service Providers (CSPs) which impacts storage and processing center selection and constraint satisfaction. The present disclosure proposes a joint optimization model for the selection of storage and processing services from multiple cloud service providers, taking into practical consideration of data regulations and tiered pricing, which has not been addressed in the prior art. To solve this hard multi-objective combinatorial optimization problem, the present disclosure utilizes a cost-reduction-based algorithm for obtaining optimal solution.

14 Claims, 6 Drawing Sheets

(56) References Cited

U.S. PATENT DOCUMENTS

| | | | |
|---|---|---|---|
| 9,317,223 B2 | 4/2016 | Reohr et al. | |
| 9,798,564 B2* | 10/2017 | Ponsford | G06F 9/5027 |
| 9,967,327 B2 | 5/2018 | Moorthi et al. | |
| 10,129,211 B2* | 11/2018 | Heath | G06Q 30/02 |
| 10,459,741 B2* | 10/2019 | Kadloor | G06F 9/5061 |
| 10,678,431 B1* | 6/2020 | Smaldone | G06F 3/0604 |
| 10,715,460 B2* | 7/2020 | Brooker | H04L 47/83 |
| 10,841,236 B1* | 11/2020 | Jin | H04L 67/10 |
| 10,877,683 B2* | 12/2020 | Wu | G06F 3/0679 |
| 11,249,998 B2* | 2/2022 | Kondiles | G06F 7/24 |
| 11,416,109 B2* | 8/2022 | Malhotra | G06F 3/0481 |
| 11,418,492 B2* | 8/2022 | Gunasingam | G06F 21/6245 |
| 11,847,490 B2* | 12/2023 | Perneti | G06F 9/45558 |
| 11,876,858 B1* | 1/2024 | Nair | H04L 67/1008 |
| 12,050,567 B2* | 7/2024 | Chang | G06F 11/1433 |
| 12,105,979 B2* | 10/2024 | Vohra | G06F 3/0604 |
| 2010/0205541 A1* | 8/2010 | Rapaport | G06Q 30/02 715/753 |
| 2013/0191843 A1* | 7/2013 | Sarkar | G06F 9/5066 718/105 |
| 2013/0268357 A1* | 10/2013 | Heath | G06Q 10/10 726/26 |
| 2013/0268672 A1 | 10/2013 | Justafort et al. | |
| 2014/0181080 A1* | 6/2014 | Wilkinson | G06F 16/24545 707/719 |
| 2014/0229221 A1* | 8/2014 | Shih | G06Q 10/06312 705/7.23 |
| 2014/0244842 A1* | 8/2014 | Rosensweig | H04L 41/18 709/226 |
| 2015/0277980 A1* | 10/2015 | Ovsiankin | G06F 9/5066 718/104 |
| 2016/0012366 A1* | 1/2016 | Srivastava | G06Q 10/06313 705/7.23 |
| 2016/0321115 A1* | 11/2016 | Thorpe | G06F 11/3409 |
| 2017/0177323 A1* | 6/2017 | Baset | G06F 8/656 |
| 2017/0193071 A1* | 7/2017 | Didcock | G06F 16/211 |
| 2017/0206012 A1* | 7/2017 | Atia | G06F 3/06 |
| 2018/0089042 A1* | 3/2018 | Demetriou | G06Q 10/0631 |
| 2018/0097702 A1* | 4/2018 | Walsh | H04L 43/0876 |
| 2018/0254999 A1* | 9/2018 | Caffee | H04L 67/60 |
| 2018/0299943 A1* | 10/2018 | McBride | G06F 13/28 |
| 2019/0146838 A1* | 5/2019 | Zott | G06F 3/067 718/104 |
| 2019/0171438 A1* | 6/2019 | Franchitti | G06N 3/08 |
| 2019/0286478 A1* | 9/2019 | Sengupta | G06F 9/4881 |
| 2019/0303608 A1* | 10/2019 | Cohen | G06N 3/042 |
| 2020/0065150 A1* | 2/2020 | Wang | G06F 3/067 |
| 2020/0210239 A1* | 7/2020 | Geigel | G06F 9/5016 |
| 2020/0326871 A1* | 10/2020 | Wu | G06F 3/0647 |
| 2020/0341786 A1* | 10/2020 | Soryal | G06F 9/5077 |
| 2021/0042830 A1* | 2/2021 | Burke | G06Q 20/341 |
| 2021/0176266 A1* | 6/2021 | Ramamurthy | G06F 9/5077 |
| 2021/0390033 A1* | 12/2021 | Singhal | G06N 3/08 |
| 2022/0043694 A1* | 2/2022 | Ramasamy | G06Q 10/06315 |
| 2022/0066832 A1* | 3/2022 | Donaghy | G06F 3/0676 |
| 2022/0091888 A1* | 3/2022 | Chen | G06F 3/0631 |
| 2022/0214864 A1* | 7/2022 | Singhal | G06F 16/9024 |
| 2022/0261278 A1* | 8/2022 | Perneti | G06F 9/5027 |
| 2023/0421358 A1* | 12/2023 | Chagam Reddy | G06F 13/1663 |
| 2024/0126604 A1* | 4/2024 | Sen | G06F 9/5016 |
| 2024/0323140 A1* | 9/2024 | Harakas | H04L 47/781 |
| 2025/0071040 A1* | 2/2025 | Wang | G16Y 40/50 |

OTHER PUBLICATIONS

Abdul Mateen et al. "A Dynamic Decision Support System for Selection of Cloud Storage Provider." (2021). Retrieved online May 9, 2025. https://www.mdpi.com/2076-3417/11/23/11296 (Year: 2021).*

Pengwei Wang et al. "Optimizing Data Placement for Cost Effective and High Available Multi-Cloud Storage." (2020). Retrieved online May 9, 2025. https://cai.type.sk/content/2020/1-2/optimizing-data-placement-for-cost-effective-and-high-available-multi-cloud-storage/4942.pdf (Year: 2020).*

* cited by examiner

METHOD AND SYSTEM FOR DATA REGULATIONS-AWARE CLOUD STORAGE AND PROCESSING SERVICE ALLOCATION

PRIORITY CLAIM

This U.S. patent application claims priority under 35 U.S.C. § 119 to: Indian Patent Application No. 202221062016, filed on 31 Oct. 2022. The entire contents of the aforementioned application are incorporated herein by reference.

TECHNICAL FIELD

The disclosure herein generally relates to the field of cloud computing and, more particularly, to a method and system for data regulations-aware cloud storage and processing service allocation.

BACKGROUND

Recently, enterprises are moving to cloud for their computation and storage requirements due to significant benefits in terms of slashed Information Technology (IT) costs, more flexibility, and increased service efficiency. In the cloud adoption phase, varied decisions are needed to be taken by the enterprise. These decisions could be related to the selection of Cloud Service Providers (CSPs), allocation of geographically distributed data sources to data center locations, data placement such that data regulations are not violated, and overall operational cost is minimal.

Efficient placement of distributed data sources and selection of these data centers by CSPs are essential to minimize the overall cost of operations in enterprises. For a given user center (data source), selecting a data center from the same region can provide better Quality of Service (QoS) and reduced transfer costs. However, this strategy can lead to the selection of many data centers and CSPs, which eventually will increase the overall cost. Also, selecting a storage center with lower transfer costs may not be an ideal solution from a storage cost perspective. As CSPs offer volume-based discounts, clubbing a few data sources could be beneficial, but as stated, it could impact the transfer cost and QoS. Thus, multiple trade-offs occur, while making effective decisions on the selection of CSPs' data centers.

However, the selection of CSPs and allocation of data centers is not only driven by the operational cost and QoS, but also the data regulations can influence this decision. Most countries are developing their own set of privacy and security, data regulations. Data Residency (DR) is one such regulation that deals with the location and movement of data across geographies and jurisdictions, and protection against unintended access. The DR regulations imposed by countries, could be either strict, conditional, or unconditional. These regulations vary according to data type and could differ for data storage and processing. Moreover, adhering to such regulations is challenging for enterprises as they must comply with the regulations to carry out businesses in their respective countries.

Conventional approaches follow pure greedy based selection of storage centers. For example, some conventional approaches select a nearest data center to keep transmission cost low and satisfy regulation criteria. However, such selection might not ensure optimal storage cost given the tier pricing policy in storage centers. Some other conventional approaches try to solve specific challenges related to geolocation of data considering bandwidth and reducing latency. Some other approaches utilize dynamic programming or divide and conquer based solution for optimal placement of user centers. However, the conventional approaches fail to address the technical problem of data placement for storage as well as processing, considering multiple criteria. Further, the conventional approaches fail to address compliance with data regulations, tier pricing policy for multiple CSPs which impacts storage and processing center selection and constraint satisfaction.

SUMMARY

Embodiments of the present disclosure present technological improvements as solutions to one or more of the above-mentioned technical problems recognized by the inventors in conventional systems. For example, in one embodiment, a method for Data regulations-aware cloud storage and processing service allocation is provided. The method includes receiving, by one or more hardware processors, an input comprising a resource requirement data pertaining to a plurality of users, a geolocation of each of the plurality of users, a plurality of data storage centers (SCs) and a plurality of processing centers (PCs). Further, the method includes obtaining, by the one or more hardware processors, a plurality of data regulations pertaining to each of the plurality of users based on a corresponding geolocation from a data regulation repository. Furthermore, the method includes generating, by the one or more hardware processors, a first feasible allocation for each of the plurality of users based on the input and the plurality of data regulations using a minimal transfer cost based optimization technique, wherein the first feasible allocation comprises an SC and a corresponding PC. Furthermore, the method includes computing, by the one or more hardware processors, a first transfer cost for each of the plurality of users based on the first feasible allocation, wherein the first transfer cost is a sum of cost to transfer data from UC to SCs and from SCs to PCs based on the first feasible allocation. Furthermore, the method includes obtaining, by the one or more hardware processors, a second feasible allocation for each of the plurality of users based on the storage cost using a storage cost optimization technique. Furthermore, the method includes computing, by the one or more hardware processors, a second transfer cost for each of the plurality of users based on the data and the second feasible solution, wherein the second transfer cost is a sum of cost to transfer data from UC to SCs and from SCs to PCs based on the second feasible allocation. Furthermore, the method includes computing, by the one or more hardware processors, a difference in transfer cost based on a comparison between the first transfer cost and the second transfer cost. Furthermore, the method includes generating, by the one or more hardware processors, a storage cost reduction matrix based on the first feasible allocation, the second feasible allocation and the difference in transfer cost. Furthermore, the method includes generating, by the one or more hardware processors, a plurality of migration pairs for each of the plurality of users based on the storage cost reduction matrix, wherein each of the plurality of migration pairs comprises a current SC where a corresponding UC resides and a new SC where the corresponding UC is to be migrated. Furthermore, the method includes generating, by the one or more hardware processors, a ranked list by sorting each of the plurality of migration pairs based on decreasing storage cost and the difference in transfer cost using Multi-Criteria Decision Making (MCDM) ranking technique. Finally, the method includes generating, by the one or more hardware processors, a tier pricing based near-optimal solution for each of the plurality of users by applying a plurality of selection criterion on the ranked list.

In another aspect, a system for Data regulations-aware cloud storage and processing service allocation is provided. The system includes at least one memory storing programmed instructions, one or more Input/Output (I/O) interfaces, and one or more hardware processors operatively coupled to the at least one memory, wherein the one or more hardware processors are configured by the programmed instructions to receive an input comprising a resource requirement data pertaining to a plurality of users, a geolocation of each of the plurality of users, a plurality of data storage centers (SCs) and a plurality of processing centers (PCs). Further, the one or more hardware processors are configured by the programmed instructions to obtain a plurality of data regulations pertaining to each of the plurality of users based on a corresponding geolocation from a data regulation repository. Furthermore, the one or more hardware processors are configured by the programmed instructions to generate by the one or more hardware processors, a first feasible allocation for each of the plurality of users based on the input and the plurality of data regulations using a minimal transfer cost based optimization technique, wherein the first feasible allocation comprises an SC and a corresponding PC. Furthermore, the one or more hardware processors are configured by the programmed instructions to compute a first transfer cost for each of the plurality of users based on the first feasible allocation, wherein the first transfer cost is a sum of cost to transfer data from UCs to SCs and from SCs to PCs based on the first feasible allocation. Furthermore, the one or more hardware processors are configured by the programmed instructions to obtain a second feasible allocation for each of the plurality of users based on the storage cost using a storage cost optimization technique. Furthermore, the one or more hardware processors are configured by the programmed instructions to compute a second transfer cost for each of the plurality of users based on the data and the second feasible solution, wherein the second transfer cost is a sum of cost to transfer data from UCs to SCs and from SCs to PCs based on the second feasible allocation. Furthermore, the one or more hardware processors are configured by the programmed instructions to compute a difference in transfer cost based on a comparison between the first transfer cost and the second transfer cost. Furthermore, the one or more hardware processors are configured by the programmed instructions to generate a storage cost reduction matrix based on the first feasible allocation, the second feasible allocation and the difference in transfer cost. Furthermore, the one or more hardware processors are configured by the programmed instructions to generate a plurality of migration pairs for each of the plurality of users based on the storage cost reduction matrix, wherein each of the plurality of migration pairs comprises a current SC where a corresponding UC resides and a new SC where the corresponding UC is to be migrated. Furthermore, the one or more hardware processors are configured by the programmed instructions to generate a ranked list by sorting each of the plurality of migration pairs based on decreasing storage cost and the difference in transfer cost using Multi-Criteria Decision Making (MCDM) ranking technique. Finally, the one or more hardware processors are configured by the programmed instructions to generate a tier pricing based near-optimal solution for each of the plurality of users by applying a plurality of selection criterion on the ranked list.

In yet another aspect, a computer program product including a non-transitory computer-readable medium having embodied therein a computer program for Data regulations-aware cloud storage and processing service allocation is provided. The computer readable program, when executed on a computing device, causes the computing device to receive an input comprising a resource requirement data pertaining to a plurality of users, a geolocation of each of the plurality of users, a plurality of data storage centers (SCs) and a plurality of processing centers (PCs). Further, the computer readable program, when executed on a computing device, causes the computing device to obtain a plurality of data regulations pertaining to each of the plurality of users based on a corresponding geolocation from a data regulation repository. Furthermore, the computer readable program, when executed on a computing device, causes the computing device to generate by the one or more hardware processors, a first feasible allocation for each of the plurality of users based on the input and the plurality of data regulations using a minimal transfer cost based optimization technique, wherein the first feasible allocation comprises an SC and a corresponding PC. Furthermore, computer readable program, when executed on a computing device, causes the computing device to compute a first transfer cost for each of the plurality of users based on the first feasible allocation, wherein the first transfer cost is a sum of cost to transfer data from UC to SCs and from SCs to PCs based on the first feasible allocation. Furthermore, the computer readable program, when executed on a computing device, causes the computing device to obtain a second feasible allocation for each of the plurality of users based on the storage cost using a storage cost optimization technique. Furthermore, the computer readable program, when executed on a computing device, causes the computing device to compute a second transfer cost for each of the plurality of users based on the data and the second feasible solution, wherein the second transfer cost is a sum of cost to transfer data from UC to SCs and from SCs to PCs based on the second feasible allocation. Furthermore, the computer readable program, when executed on a computing device, causes the computing device to compute a difference in transfer cost based on a comparison between the first transfer cost and the second transfer cost. Furthermore, the computer readable program, when executed on a computing device, causes the computing device to generate a storage cost reduction matrix based on the first feasible allocation, the second feasible allocation and the difference in transfer cost. Furthermore, the computer readable program, when executed on a computing device, causes the computing device to generate a plurality of migration pairs for each of the plurality of users based on the storage cost reduction matrix, wherein each of the plurality of migration pairs comprises a current SC where a corresponding UC resides and a new SC where the corresponding UC is to be migrated. Furthermore, the computer readable program, when executed on a computing device, causes the computing device to generate a ranked list by sorting each of the plurality of migration pairs based on decreasing storage cost and the difference in transfer cost using Multi-Criteria Decision Making (MCDM) ranking technique. Finally, the computer readable program, when executed on a computing device, causes the computing device to generate a tier pricing based near-optimal solution for each of the plurality of users by applying a plurality of selection criterion on the ranked list.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Most countries have come up with varied data privacy regulations and some countries have stringent data storage and processing regulations, while others allow conditional data transfer across borders. For enterprises with geographically distributed data sources (users), it becomes challenging to select cloud data centers that meet Data Residency (DR) regulations/data regulations and have minimal overall operational costs.

Embodiments herein provide a method and system for data regulations-aware cloud storage and processing service allocation. The present disclosure proposes a joint optimization model for the selection of storage and processing services from multiple cloud service providers, considering, a practical consideration of data regulations and tiered pricing, which has not been addressed in the prior art. To solve this hard multi-objective combinatorial optimization problem, the present disclosure utilizes a cost-reduction-based algorithm for obtaining optimal solution.

Initially, the system receives an input including a resource requirement data pertaining to a plurality of users, a geolocation of each of the plurality of users, a plurality of data storage centers (SCs) and a plurality of processing centers (PCs). Further, a plurality of data regulations pertaining to each of the plurality of users are obtained based on a corresponding geolocation from a data regulation repository.

After that, a first feasible allocation is generated for each of the plurality of users based on the input and the plurality of data regulations using minimal transfer cost based optimization technique. After generating the first feasible allocation a first transfer cost is computed for each of the plurality of users based on the first feasible allocation. Further, a second feasible allocation for each of the plurality of users based on the storage cost using a storage cost optimization technique. After generating the second feasible allocation, a second transfer cost is computed for each of the plurality of users based on the data and the second feasible solution. Further, a difference in transfer cost is computed based on a comparison between the first transfer cost and the second transfer cost. Further, a storage cost reduction matrix is generated based on the first feasible allocation, the second feasible allocation and the difference in transfer cost. Post generating the storage cost reduction matrix, a plurality of migration pairs are generated for each of the plurality of users based on the storage cost reduction matrix. Further, a ranked list is generated by sorting each of the plurality of migration pairs based on decreasing storage cost and the difference in transfer cost using Multi-Criteria Decision Making (MCDM) ranking technique. Finally, a tier pricing based near-optimal solution is generated for each of the plurality of users by applying a plurality of selection criterion on the ranked list.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

Figure 1:
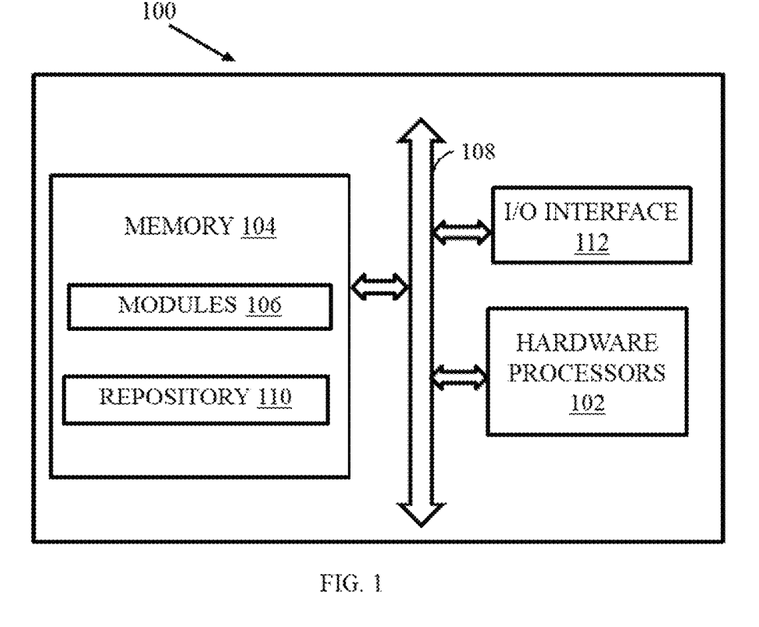
FIG. 1 is a functional block diagram of a system for data regulations-aware cloud storage and processing service allocation, in accordance with some embodiments of the present disclosure.

FIG. 1 is a functional block diagram of a system for the data regulations-aware cloud storage and processing service allocation, in accordance with some embodiments of the present disclosure. The system 100 includes or is otherwise in communication with hardware processors 102, at least one memory such as a memory 104, and an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 of the system 100 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 of the system 100 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 of the system 100 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

Figure 2:
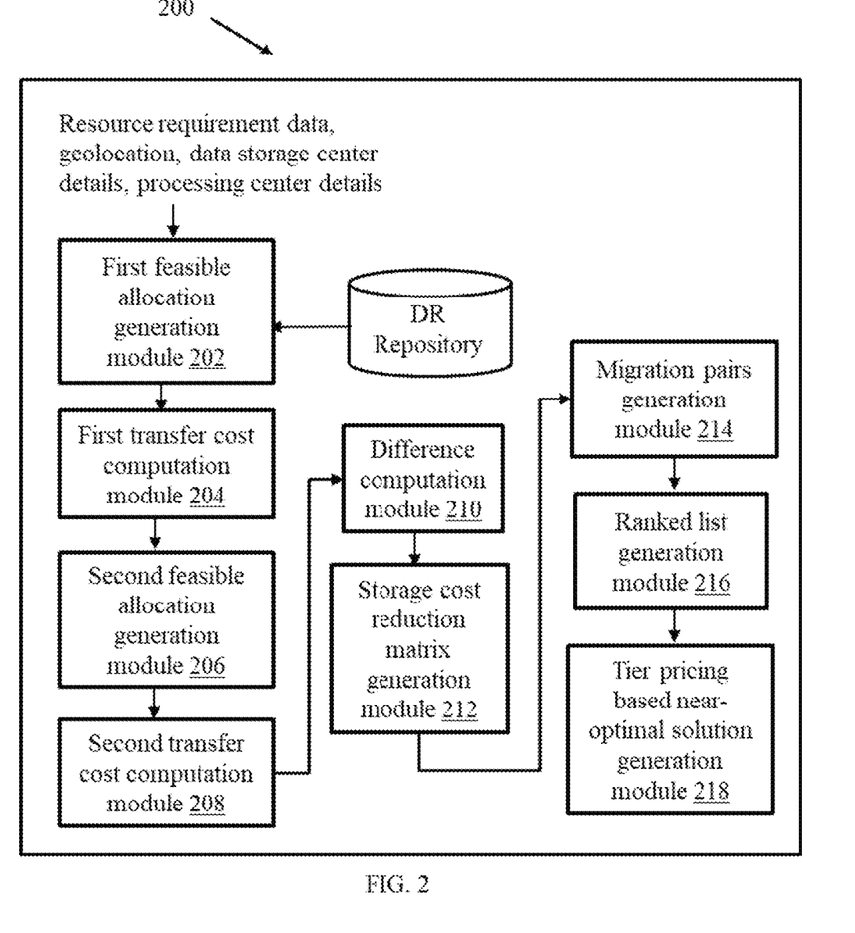
FIG. 2 illustrates a functional architecture of the system of FIG. 1, for data regulations-aware cloud storage and processing service allocation, in accordance with some embodiments of the present disclosure.

The plurality of modules 106 of the system 100 include programs or coded instructions that supplement applications or functions performed by the system 100 for data regulations-aware cloud storage and processing service allocation. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the semantic navigation using spatial graph and trajectory history. In an embodiment, the plurality of modules 106 include a first feasible allocation generation module (shown in FIG. 2), a First transfer cost computation module (shown in FIG. 2), a second feasible allocation generation module (shown in FIG. 2), a second transfer cost computation module (shown in FIG. 2), a difference computation module (shown in FIG. 2), a storage cost reduction matrix generation module (shown in FIG. 2), a migration pairs generation module (shown in FIG. 2), a ranked list generation module (shown in FIG. 2) and a tier pricing based near-optimal solution generation module (shown in FIG. 2). In an embodiment, FIG. 2 illustrates a functional architecture of the system 100 of FIG. 1, for the data regulations-aware cloud storage and processing service allocation, in accordance with some embodiments of the present disclosure.

The data repository (or repository) 110 of the system 100 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100 of FIG. 1, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Working of the components of the system 100 are explained with reference to the method steps depicted in FIGS. 3A and 3B.

Figure 3A:
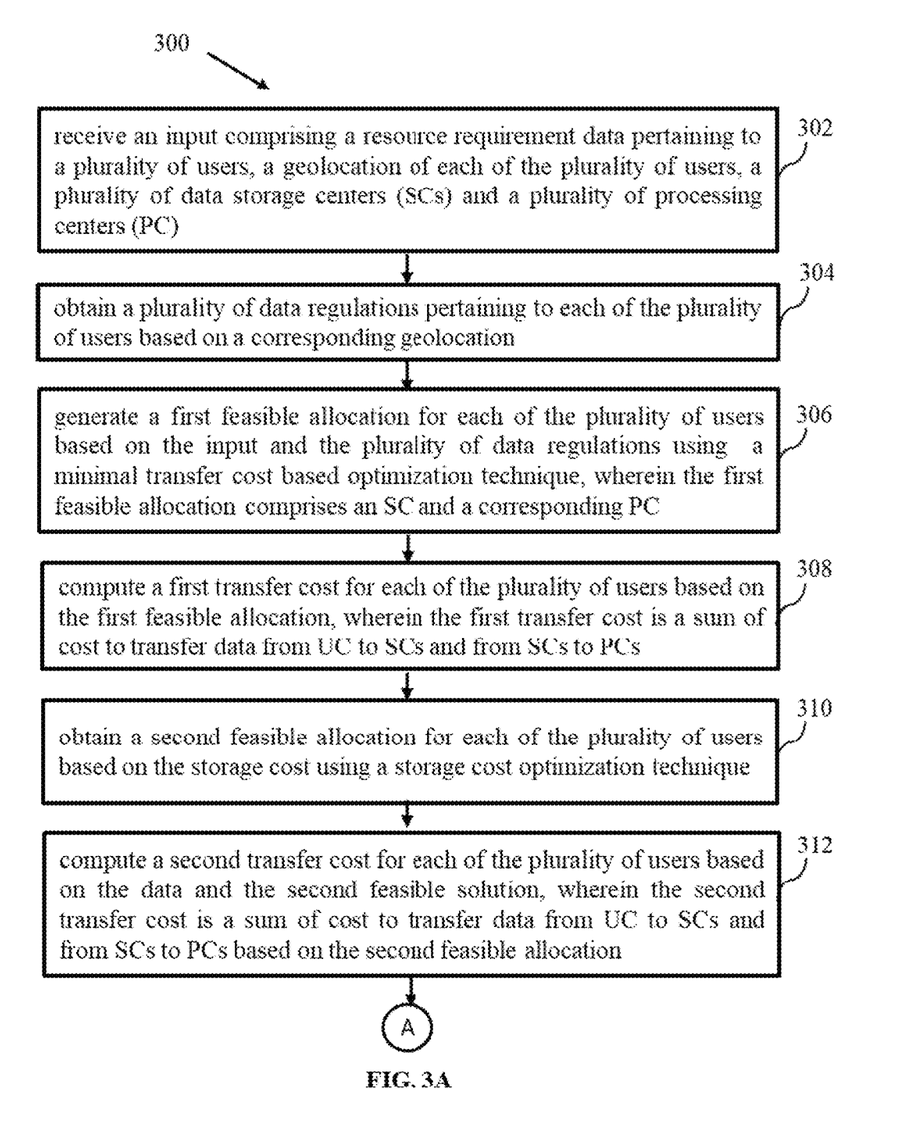
FIGS. 3A and 3B are exemplary flow diagram illustrating a processor implemented method 300 for data regulations-aware cloud storage and processing service allocation implemented by the system of FIG. 1 according to some embodiments of the present disclosure.
Figure 3B:
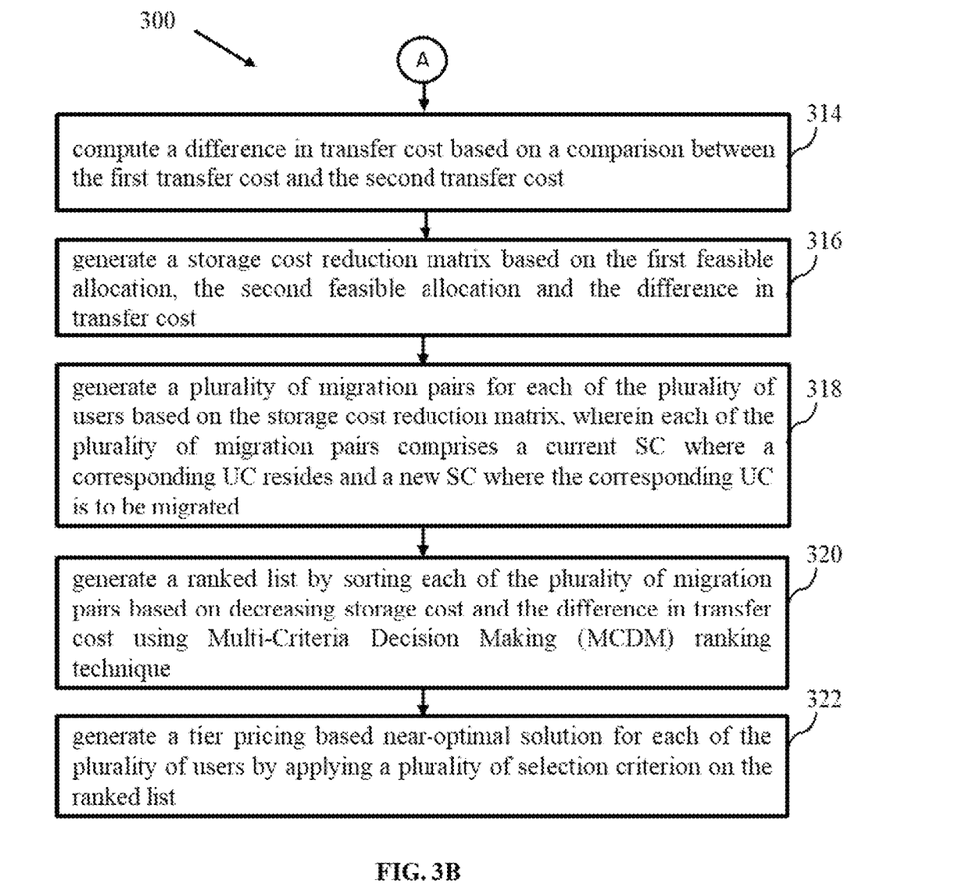

FIGS. 3A and 3B are an exemplary flow diagrams illustrating a method 300 for the data regulations-aware cloud storage and processing service allocation implemented by the system 100 of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 300 by the one or more hardware processors 102. The steps of the method 300 of the present disclosure will now be explained with reference to the components or blocks of the system 100 as depicted in FIG. 1 and the steps of flow diagram as depicted in FIGS. 3A and 3B. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

In an embodiment, organizations providing cloud service typically provides multiple Cloud Storage and Processing (CSP) centers where users data can be stored and processed. A user/User Center (UC)/user enterprise, for its geographically distributed data sources, can opt for separate storage and processing services offered by various cloud platforms. This separation of storage and compute operations helps in saving costs, scaling resources on demand and providing better security. Further, the user enterprises are seeking multi-cloud options to avoid vendor lock-in, to avail the benefits of good quality of service, and to abide by data regulations.

In an embodiment, notations used in the present disclosure are given in the following Table I. Now referring to Table I, USD indicates United States Dollar and GB is Gigabytes.

TABLE I

| Notation | Explanation |
| --- | --- |
| U | Set of user centers (UCs) |
| S | Set of data storage centers (SCs) of all CSPs |
| P | Set of data processing centers (PCs) of all CSPs |
| $D_i$ | Amount of user data at UC (i) (GB) |
| $Cap\_S_j$ | Data storage capacity at SC (j) (GB) |
| $Cap\_P_k$ | Data processing capacity at PC (k) (GB) |
| $C_{ij}^s$ | Transfer cost between UC (i) & SC (j) (USD/GB) |
| $C_{jk}^p$ | Transfer cost between SC (j) & PC (k) (USD/GB) |
| $\beta_{ij}^s$ | DR regulation between UC (i) & SC (j) |
| $\beta_{ik}^p$ | DR regulation between UC (i) & PC (k) |
| w | Weightage given to transfer cost $C_{ij}^s$ |
| ψ | Maximum no. of PCs connected to a SC |
| T | Set of tiers/price breaks/data breaks |
| $c_j^t$ | Tier storage cost at SC (j) for tier (t) (USD/GB) |

TABLE I-continued

| Notation | Explanation |
|---|---|
| $d_j^t$ | Data break point for SC (j) for tier (t) (GB) |
| B | Storage budget across all SCs (USD) |

At step 302 of the method 300, the one or more hardware processors 102 are configured by the programmed instructions to receive the input including the resource requirement data pertaining to the plurality of users, the geolocation of each of the plurality of users, the plurality of data SCs and the plurality of PCs available in a cloud network. For example, the resource requirement data of the users includes the data storage and the processing power needed by a UC associated with the user.

In an embodiment, each geography or country is associated with a corresponding regulation/data regulation to be followed in cloud environment. These regulations are varied, some are conditional, while some are stringent. The regulations could vary according to the type of data (Health, Finance, Personal, and so on) handled and could differ for storage and processing activity. Some countries such as China, Russia, and Indonesia follow a strict data localization approach. This means data related to citizens of such countries has to be mandatorily stored and processed in local data centers within those countries. Some countries follow conditional cross-border data transfer regulations. The conditions could be varied for data type, and organizations are allowed to operate if those conditions are met. For example, General Data Regulation protection (GDPR) for European citizens allows conditional data transfer. Other examples include Nigeria, which mandates payment-related data to be processed only in local data centers. Indonesia allows the cross-border transfer of health care data only if it is stored domestically for a fixed duration of time. Similarly, India permits the cross-border transfer of financial data only if a local copy is stored in the local data centers. Some countries have strict localization criteria only for a specific type of data. For example, Australia localizes health data, Germany localizes telecommunications data and South Korea localizes map data related to its citizens.

In an embodiment, these data regulations pertaining to each geographical location/country of the users are converted into mathematical models and stored in data regulation repository. At step 304 of the method 300, the one or more hardware processors 102 are configured by the programmed instructions to obtain the plurality of data regulations pertaining to each of the plurality of users based on a corresponding geolocation from the data regulation repository.

At step 306 of the method 300, the first feasible allocation generation module 202 executed by one or more hardware processors 102 is configured by the programmed instructions to generate, the first feasible allocation for each of the plurality of users based on the input and the plurality of data regulations using the minimal transfer cost based optimization technique. The first feasible allocation comprises an SC and a corresponding PC allocated to each of the plurality of users.

In an embodiment, the method of generating the first feasible solution is explained below: Initially, a first plurality of feasible SCs and a corresponding plurality of feasible PCs are identified for each of the plurality of users based on a mapping with the plurality of data regulations pertaining to each of the plurality of users. For example, the data regulations are compared and the feasible SCs and PCs capable of serving each user are identified. Further, one SC, from among the first plurality of feasible SCs, with a transfer cost between a UC and SC less than a first predefined threshold is allocated to each of the plurality of users based on the following conditions. The conditions/constraints (given in equations 1 through 17) include (i) a corresponding plurality of data regulations are satisfied (ii) data size of a corresponding UC is less than a predefined storage capacity of the SC and (iii) data transferred from SC to PC is less than a predefined storage threshold, wherein the predefined storage threshold is a minimum of storage capacity of the plurality of PCs, wherein a total storage cost is computed for each allocated SC.

In an embodiment, after allocating the SC, a corresponding PC from among the first plurality of feasible PCs is allocated to each allocated SC with a transfer cost between the SC and the corresponding PC less than a second predefined threshold based on the following conditions: (i) the corresponding plurality of data regulations are satisfied and (ii) the data processing capacity of the corresponding PC is less than a predefined processing capacity.

In an embodiment, a pseudocode for generating the first feasible allocation is given in the following Pseudocode 1. Now referring to the pseudocode 1, each user center is assigned to an SC with a minimal transfer cost and satisfying the plurality of data regulations. The UC can be assigned to the SCs, if the individual storage capacity of the SC is not violated. Also, the PC to which a SC would be allocated have limited storage capacity. Hence, it is necessary to ensure that the data transferred from a SC to a PC must not exceed the storage capacity of a PC. In an embodiment, different PCs have individual storage capacities. Assignment of PCs to SCs is done only after assignment of all users to SCs. Hence, a limit is set on the amount of data stored at each storage center using a threshold value (A) to ensure that the data from a SC does not completely overload any PC. Since the number of PCs are usually lower than the number of SCs, this threshold value (A) also avoids infeasibility during data transfer. To generate first the feasible solution, the amount of data stored in a SC is bounded by the lowest storage capacity among all PCs as the value of A.

Pseudocode 1: Generate first feasible solution

1. Procedure: GenInSol
2. Let storage capacity of SC = λ
3. for each user assign storage center with minimum transfer cost, if
   i. DR (Data Regulation) criteria is met
   ii. Amount of data in each SC does not exceed its own storage capacity and λ limit.
4. Update TotalSC, TotalTC(U→S) with each allocation
5. for each SC assign PC with minimum transfer cost, if:
   i. DR criteria is met
   ii. Processing data capacity of the PC is not exceeded.
6. Update TotalTC(S→P) with each allocation.
7. End procedure Now referring to FIGS. 3A and 3B, at step 308 of the method 300, the first transfer cost computation module 204 executed by the one or more hardware processors 102 is configured by the programmed instructions to compute the first transfer cost for each of the plurality of users based on the first feasible allocation. The first transfer cost is a sum of cost to transfer data from UC to SCs and from SCs to PCs based on the first feasible allocation.

At step 308 of the method 300, the second feasible allocation generation module 206 executed by the one or more hardware processors 102 is configured by the programmed instructions to obtain the second feasible allocation for each of the plurality of users based on the storage cost using the storage cost optimization technique. The storage cost optimization technique iteratively checks (a set of conditions as given in equations (18) to (22)) whether (i) the storage cost of each allocated SC is less than the storage cost identified in the initial feasible solution, (ii) data regulation criteria is satisfied (iii) storage capacity of each allocated SC is less than the predefined storage capacity and (iv) processing capacity of the PC assigned to the SC is less than the predefined processing capacity. The transfer cost, amount of data stored in SCs and PCs are updated in each iteration.

In an embodiment, the storage cost of the present disclosure is performed based on tier pricing. The tier pricing is a pricing model apart from linear pricing. In linear pricing, the data storage cost per unit of memory, remains constant. While in tiered pricing, the pricing function could be non-linear or stepwise linear. The pricing scheme is divided into few tiers (generally 1, 2 or 3 tiers). Each tier has a specific amount of storage memory. For the first tier, generally the storage cost per unit of memory is the highest. For the subsequent tiers the storage cost per unit memory decreases, and the cost is lowest for the last tier.

The following Table II represents an example tier pricing-data value of a CSP. Each row indicates a SC (j), and each column indicates a tier (t). Cell value represent a (data-cost) pair. The interpretation of cell values is as follows: for storage center $S_2$, the price for the first 50 GB is 0.025 USD/GB. For the next 450 GB (=500-50), price is 0.024 USD/GB and for over 500 GB, the price is 0.023 USD/GB. Table II explains tier storage cost calculation.

TABLE II

| SC | Tier | | |
|---|---|---|---|
| | $t_1$ | $t_2$ | $t_3$ |
| $S_1$ | (50, 0.0230) | (500, 0.0220) | 0.0210 |
| $S_2$ | (50, 0.0250) | (500, 0.0240) | 0.0230 |
| $S_3$ | (50, 0.0245) | (500, 0.0235) | 0.0225 |
| $S_4$ | (50, 0.0260) | (500, 0.0250) | 0.0240 |

In an embodiment, TABLE III illustrates the tier Storage Cost Calculation for a SC.

TABLE III

| Amount of Data (Q) | $Q \leq d_j^{t_1}$ | $d_j^{t_k} < Q \leq d_j^{t_{k+1}}$ |
|---|---|---|
| Storage Cost | $Q * c_j^{t_1}$ | $\left\{\sum_{i=1}^{k}(d_j^{t_i} - d_j^{t_{i-1}})c_j^{t_i}\right\} + (Q - d_j^{t_k})c_j^{t_{k+1}}$ |

In an embodiment, the conditions/constraints for generating the first feasible allocation and the second feasible allocation are explained with reference to equations (1) through (24).

$$\sum_{j \in S} x_{ij} = 1 \ \forall \ i \in U \quad (1)$$

$$\sum_{k \in P} z_{ik} = 1 \ \forall \ i \in U \quad (2)$$

$$\sum_{k \in P} y_{jk} \leq \psi \ \forall \ j \in S \quad (3)$$

$$\sum_{i \in U} x_{ij} D_i = u_j \ \forall \ j \in S \quad (4)$$

$$\sum_{t \in T} I_{jt} = u_j \ \forall \ j \in S \quad (5)$$

$$\sum_{j \in S} z_{ik} D_i = v_k \ \forall \ k \in P \quad (6)$$

$$\sum_{j \in S} q_{jk} = v_k \ \forall \ k \in P \quad (7)$$

$$\sum_{j \in S}\sum_{t \in T} I_{jt} c_j^t \leq B \quad (8)$$

$$u_j \leq Cap\_S_j \ \forall \ j \in S \quad (9)$$

$$v_k \leq Cap\_P_k \ \forall \ k \in P \quad (10)$$

$$x_{ij} \leq \beta_{ij}^S \ \forall \ i \in U \ \& \ j \in S \quad (11)$$

$$z_{ik} \leq \beta_{ik}^P \ \forall \ i \in U \ \& \ k \in P \quad (12)$$

$$q_{jk} \leq M_1 \cdot y_{jk} \ \forall \ j \in S \ \& \ k \in P \quad (13)$$

$$y_{jk} \geq x_{ij} + z_{ik} - 1 \ \forall \ i \in U, j \in S \ \& \ k \in P \quad (14)$$

$$I_{jt} \leq (d_j^t - d_j^{t''}) \cdot p_{jt} \ \forall \ j \in S \ \& \ t \in T \quad (15)$$

$$I_{jt} \geq (d_j^t - d_j^{t''}) \cdot p_{jt'} \ \forall \ j \in S \ \& \ t \in T \quad (16)$$

$$u_j \geq d_j^t \cdot p_{jt'} \ \forall \ j \in S \ \& \ t \in T \quad (17)$$

$$u_j \leq d_j^t \cdot (1 - p_{jt'}) + M_2 \cdot p_{jt'} \ \forall \ j \in S \ \& \ t \in T \quad (18)$$

$$x_{ij} \in \{0, 1\} \ \forall \ i \in U \ \& \ j \in S \quad (19)$$

$$y_{jk} \in \{0, 1\} \ \forall \ j \in S \ \& \ k \in P \quad (20)$$

$$z_{ik} \in \{0, 1\} \ \forall \ i \in U \ \& \ k \in P \quad (21)$$

$$p_{jt} \in \{0, 1\} \ \forall \ j \in S \ \& \ t \in T \quad (22)$$

Now referring to equations (1) through (22), equations (1), (2) and (3) are the allocation constraints. The constraints in equations (1) and (2) ensures that every UC is allocated to exactly one SC and one PC. While constraint in equation (3) states that a SC can be assigned to multiple PCs which is bounded by ($\psi$) i.e., the maximum number of PCs. In the present disclosure, $\psi=1$. Equations (4), (5), (6) and (7) are the utilization constraints, which capture the total amount of data at every SC and PC respectively. Equation (8) is the budget constraint, which restricts the total storage cost within storage budget across all SCs. Equations (9) and (10) are the capacity constraints, which limit the amount of data allocated to each storage and processing center respectively.

In an embodiment, equations (11) and (12) are the data regulation constraints, which ensure that the data regulations must be followed at each SC and PC respectively. For example, if a country regulatory does not allow cross-border storing or processing of its citizens' data, then this value ($\beta_{ij}^S$ and $\beta_{ik}^P$) would be 0. Equations (13) and (14) are the relationship constraint, which stablishes a relationship among the decision variables of the model $x_{ij}$, $z_{ik}$, $y_{jk}$ and $q_{jk}$.

In an embodiment, equation (13) limits the amount of data transfer from SC (j) to PC (k). It also ensures that no amount of data should be transferred from SC (j) to PC (k), if there is no allocation between SC (j) and PC (k), if there is an allocation between SC (j) and PC (k), then the amount of data transfer from SC (j) to PC (k) can be a large positive integer value. Therefore, a parameter $M_1$ is introduced in the equation (13). The value of parameter $M_1$ in the equation (13) can be confined by $\min(Cap\_S_j, Cap\_P_k, \Sigma_{i \in U} D_i)$. Equation (14) ensures that, if there is an allocation between UC (i) and SC (j) and between UC (i) and PC (k), then there must be an allocation between SC (j) and PC (k).

In an embodiment, equations (15) and (16) are the distribution constraints which distribute the amount of data for each tier (t) and for each SC (j). Equations (17) and (18) are the limitation constraints which limit the amount of data at each SC (j). Equation (17) ensures that if $(t+1)^{th}$ tier is selected, then the amount of data stored at each SC (j) must be at least $t^{th}$ tier data limit. Equation (18) ensures that if $(t+1)^{th}$ tier is not selected, then the amount of data stored at SC (j) must not go beyond the $t^{th}$ tier data limit. If $(t+1)^{th}$ tier is selected, then the amount of data stored at each SC (j) can be a large positive integer value. Hence, the parameter $M_2$ is introduced in the equation (18), whose value can be confined by $\Sigma_{i \in U} D_i$.

Now referring to equations (19), (20), (21) and (22), the decision variables $x_{ij}=1$, if all the data is transferred from UC (i) to SC (j), otherwise 0, $Z_{ik}=1$ if all the data is transferred from UC (i) to PC (k), otherwise 0, $y_{jk}=1$, if the data is transferred from SC (j) to PC (k), otherwise 0, and $q_{jk} \in [0, \min(Cap\_S_j, Cap\_P_k)]$ is the amount of data transferred from SC (j) to PC (k). Two integer variables $u_j \in [0, Cap\_S_j]$ and $V_k \in [0, Cap\_P_k]$ are introduced which capture the amount of data stored at each SC and PC respectively. $p_{jt}=1$ if $t^{th}$ tier is used for SC (j), otherwise 0, and the integer variable $I_{jt} \in [0, (d_j^{t'} - d_j^{t''})]$ represent amount of data allotted in tier (t) for SC (j). The relationship among the indexes of tiers t, t' and t" is given by $t'=(t+1)^{th}$ and $t''=(t-1)^{th}$ tier from the set of tiers.

At step 310 of the method 300, the difference computation module 208 executed by the one or more hardware processors 102 is configured by the programmed instructions to compute the second transfer cost for each of the plurality of users based on the data and the second feasible solution, wherein the second transfer cost is a sum of cost to transfer data from UC to SCs and from SCs to PCs based on the second feasible allocation.

At step 312 of the method 300, the second transfer cost computation module 210 executed by the one or more hardware processors 102 is configured by the programmed instructions to compute the difference in transfer cost based on a comparison between the first transfer cost and the second transfer cost.

At step 314 of the method 300, the storage cost reduction matrix generation module 212 executed by the one or more hardware processors 102 is configured by the programmed instructions to generate the storage cost reduction matrix based on the first feasible allocation, the second feasible allocation and the difference in transfer cost. An example storage cost reduction matrix is shown in following Table IV. Now referring to Table IV, $U_1, U_2 \ldots U_n$ are the users/UCs, $S_1, S_2 \ldots S_m$ are the SCs. "In." indicates initially allocates storage cost (storage cost computed during first feasible allocation), "N/A" indicates, $U_i$ can't be allocated $S_j$ because of capacity or data regulation violation. "Δ" indicates that there is reduction in storage cost when compared to first feasible allocation.

TABLE IV

| | $S_1$ | $S_2$ | ... | $S_m$ |
|---|---|---|---|---|
| $U_1$ | Δ | N/A | ... | In. |
| $U_2$ | In. | Δ | ... | Δ |
| ... | | | ... | |
| ... | | | ... | |
| ... | | | ... | |
| $U_n$ | N/A | Δ | ... | In. |

At step 316 of the method 300, the migration pairs generation module 214 executed by the one or more hardware processors 102 is configured by the programmed instructions to generate the plurality of migration pairs for each of the plurality of users based on the storage cost reduction matrix. Each of the plurality of migration pairs includes a current SC where a corresponding UC resides and a new SC where the corresponding UC is to be migrated as shown in Table V. Now referring to Table V, $TC_{ij}$ is the transfer cost to migrate from UC to SC and $TC_{jk}$ is the transfer cost to migrate from SC to PC. Considering the migration $U_1(S_m \rightarrow S_1)$, wherein the user/UC $U_1$ is to be migrated from the $S_m$ to $S_1$, the storage cost is 30.26, $TC_{ij}$ is −17.86 and $TC_{jk}$ is 10.56. Here, the negative transfer cost values indicate increase in transfer cost.

TABLE V

| | Storage Cost | $TC_{ij}$ | $TC_{jk}$ |
|---|---|---|---|
| $U_1(S_m \rightarrow S_1)$ | 30.26 | −17.86 | 10.59 |
| $U_1(S_m \rightarrow S_x)$ | 10.07 | 12.34 | 11.35 |
| $U_3(S_n \rightarrow S_1)$ | 25.37 | −20.58 | −3.08 |
| $U_4(S_1 \rightarrow S_y)$ | 12.89 | 10.83 | −6.83 |
| ... | ... | ... | ... |

At step 318 of the method 300, the ranked list generation module 216 executed by the one or more hardware processors 102 is configured by the programmed instructions to generate the ranked list as shown in Table VI by sorting each of the plurality of migration pairs based on decreasing storage cost and the difference in transfer cost using Multi-Criteria Decision Making (MCDM) ranking technique.

TABLE VI

| Migration Pairs | Rank |
|---|---|
| $U_1(S_m \rightarrow S_1)$ | 1 |
| $U_3(S_n \rightarrow S_1)$ | 2 |
| $U_4(S_1 \rightarrow S_y)$ | 3 |
| ... | ... |

At step 320 of the method 300, the tier pricing based near-optimal solution generation module 218 executed by the one or more hardware processors 102 is configured by the programmed instructions to generate the tier pricing based near-optimal solution for each of the plurality of users by applying a plurality of selection criterion on the ranked list.

In an embodiment, the plurality of selection criteria includes (i) a higher rank based selection (ii) a capacity based selection and (iii) a dependency based selection. The higher rank based selection selects a migration pair with higher MCDM rank. For example, if a higher ranked pair $(U_i, S_{new})$ is selected, then all the remaining lower ranked pairs associated with $U_i$ are rejected, as one user is assigned to only one SC.

In an embodiment, the capacity based selection selects a migration pair only if allocation do not violate the predefined storage capacity and the predefined processing capacity. For example, say, next high ranked pair is ($U_2$, $S_{new}$). Here, $S_{new}$ is the same storage center where earlier $U_i$ was assigned. Hence, the pair can be selected, if the storage capacity of $S_{new}$ and the storage capacity of $P_{old}$ assigned to $S_{new}$ does not exceed.

In an embodiment, the dependency based selection selects a current migration pair based on an impact of current migration pair on a plurality of higher ranked migration pairs dependent on the current migration pair, wherein the current migration is selected only if there is any reduction in storage cost on the plurality of higher order migrations dependent on the current migration pair. For example, if the next high ranked pair is, (i) ($U_3$, $S_j$)→($U_3$, $S_{old}$) or (ii) ($U_4$, $S_{new}$)→($U_4$, $S_x$). Here, $U_3$ is getting migrated to $S_{old}$ and $U_4$ is getting migrated from $S_{new}$, SC. In these SCs some users were re-assigned in the earlier iterations. For example: ($U_2$, $S_{old}$)→($U_2$, $S_{new}$). Hence, the pair can be selected, if the updated reduction in storage cost is positive and other criteria of storage capacity is met. Based on that selection or rejection decision would be made.

In an embodiment, a pseudocode for generating the tier pricing based near-optimal solution is given in the following Pseudocode 2. Now referring to the pseudocode 2, the criteria used for MCDM ranking include reduction in storage cost and change in transfer costs. The ranking score is computed as follows. Consider, r attributes {$a_1, a_2, \ldots, a_r$}. Let $w_k$ be the weight given to $k^{th}$ attribute. Each pair μ ($U_i$, $S_{new}$) is ranked based on the score is computed using the formula given in equation (23).

$$\text{Score} = \sum_{k=1}^{r} w_k * \left( \frac{\min(a_k)}{a_k} \right) \; \forall \; \mu \, (U_i, S_{new}) \qquad (23)$$

Experimentation Details

In an embodiment, the present disclosure has been tested with varied test cases and problem instances. A problem instance is represented as (P-n-m-q) where P stands for Problem instance and (n, m, q) are the number of UCs, SCs and PCs respectively. The problem instances were generated in the range of UCs (n~(500, 1000)), SCs (m~(25, 50)) and PCs (q~(5, 10)). The data regulation prohibition % considered was {0, 2.5, 5, 7.5, 10}. 0% prohibition implies that there is no restriction, and 2.5% prohibitions imply that 25 user locations among 1000 users, have stringent data regulations pertaining to both storage and processing. For strict regulations, the values of ($\beta_{ij}^S$) and ($\beta_{ik}^P$) is 0. The amount of data at each user center ($D_i$) is generated uniformly in the range [$D_{min}$, $D_{max}$]=[100, 1100]. The storage and processing capacity at each SC (Cap_$S_j$) and PC (Cap_$P_k$) are uniformly distributed in the range [n·$D_{max}$·$\rho_1$, n·$D_{max}$·$\rho_2$], where value of $\rho_1$ and $\rho_2$ varied accordingly with relation $\rho_1 \leq \rho_2$ in range [0, 1]. The transfer cost between UCs and SCs ($c_{ij}^s$) and SCs and PCs ($c_{jk}^P$) are generated using uniform distribution in the range [0.01, 0.25] and [0.01, 0.20] respectively. The Storage cost for linear ($c_j$) and tier ($c_j^t$) pricing model is generated using uniform distribution in range [0.01, 0.10]. The weightages given to storage cost in MCDM ranking in the present disclosure are {0, 0.25, 0.5, 0.75, 1}. Here, 0 weightage implies that full weightage is given to transfer cost, and 1 weightage implies that full weightage is given to storage cost.

The experimentation results are discussed below.

If each user center selects storage service location with minimal transfer cost (i.e., latency), eventually it could lead to selecting many storage centers. Overall, total transfer cost from user centers to storage centers would be minimal, but the transfer cost to processing center would increase, resulting in higher total cost.

---

Pseudocode 2: Cost Reduction and MCDM Ranking

---

Figure 4:
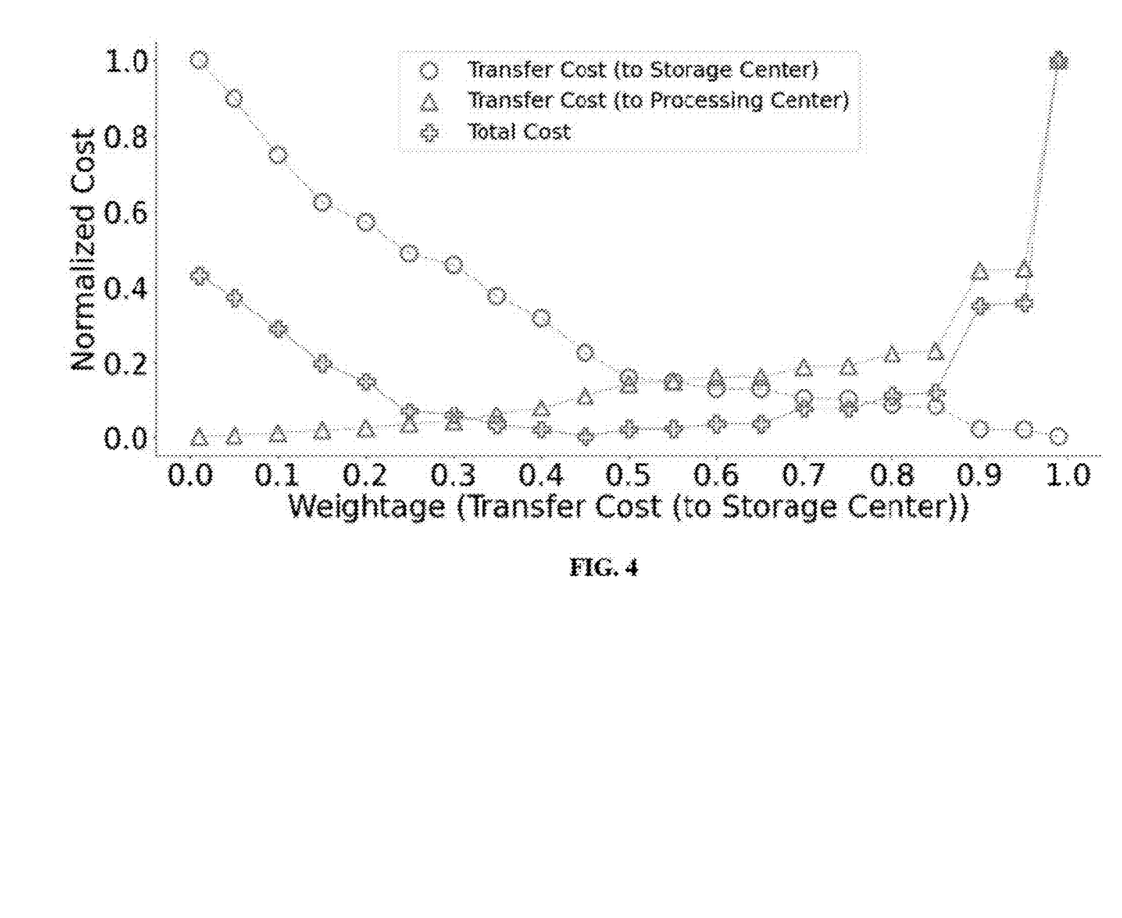
FIGS. 4 and 5 are experimental results for the processor implemented method for data regulations-aware cloud storage and processing service allocation implemented by the system of FIG. 1 according to some embodiments of the present disclosure.

1. Procedure: Algorithm for cost reduction and MCDM ranking
2. Generate an initial allocation by using SPLAP-GenInSol Algorithm ($U_i$, $S_{old}$, $P_{old}$)
3. for each user center ($U_i \rightarrow S_{old}$)
    for each SCs, where ($S_{new} \neq S_{old}$)
    • Compute: Δ = {μ ($U_i$, $S_{old}$)} − μ ($U_i$, $S_{new}$)} //reduction in storage cost
      (Δ) by migrating the $i^{th}$ user from old SC ($S_{old}$) to new SC ($S_{new}$).
    • Check: Data regulations for storage and processing are not violated.
    • Check: Data storage capacity of new SC is not exceeded.
    • Check: Data storage capacity of old PC does not exceed with this new migration.
    • Compute: Change in transfer cost for ($U_i$, $S_{new}$, $P_{old}$)
    • Record μ ($U_i$, $S_{new}$, $P_{old}$): If Δ > 0, and all criteria are met.
4. Rank all the feasible matching pairs (μ) using MCDM.
5. for each ranked pair
    • Select the highest ranked pair ($U_i$, $S_{new}$).
    • Reject all the remaining lower ranked pairs associated with the user ($U_i$). //As one user is assigned to only one SC.
    • Update the capacities of SC and PC, where migrations occurred.
    • Process of selection and rejection is repeated until no combination is left.
    • A new solution is generated.
6. Cost-reduction process is repeated with new solution (Step 3-4-5) until there is no further reduction in total storage cost.
7. End procedure FIG. 4 displays the behavior of the objective function given in equation (24) and the results are demonstrated for a test case of the problem instance (P-100-7-5). It is observed that there is trade-off between the two-transfer costs (that is, storage and processing transfer cost). It is further observed that as the weightage (w) increases, transfer cost (UCs-SCs) decreases, while transfer cost (SCs-PCs) increases. The total cost (transfer cost and storage cost) follows the convex curve.

$$\min w\Sigma_{i \in U}\Sigma_{j \in S}x_{ij}D_{i}C_{ij}^{S}+(1-w)\Sigma_{j \in S}\Sigma_{k \in P}q_{jk}C_{jk}^{P} \quad (24)$$

Figure 5:
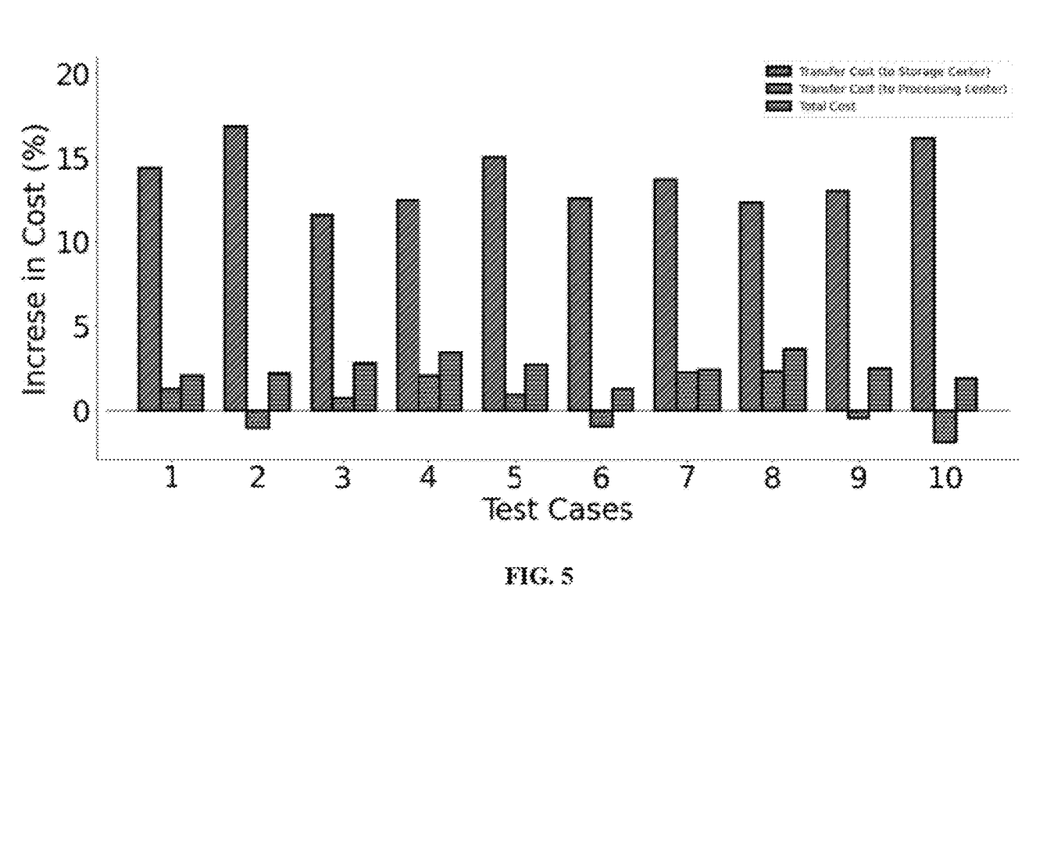

FIG. 5 depicts the percentage increase in transfer cost and total cost when DR regulations are considered in the model. Here, transfer cost from UC to SC is represented using slanting line pattern, the transfer cost from SC to PC is represented using dotted pattern and total cost is represented using horizontal line pattern. For example, in test case 8, there is 12.3% increase in storage transfer cost, 2.3% increase in processing transfer cost and 3.6% increase in total cost. For some test cases {2, 6, 9, and so on}, the processing transfer cost decreases. This is due to trade-off between the storage and processing transfer cost.

In an embodiment, Table VII illustrates the implication of the present disclosure with and without applying data regulations. The results imply that with the increase in DR prohibitions, the violations in regulations at each stage of storage and processing increases as well as increase in cost. The average increase in total cost is 1.1%. This cost is relatively very low compared to the high penalty imposed by the governments or agencies or regulatory bodies. These violations are prohibited using the present disclosure. Here an example problem instance P-500-25-5 indicates that there are 500 UCs, 25 SCs and 5 PCs.

TABLE VII

| Problem Instance | DR Prohibitions (%) | Violation (%) Storage Centre | Violation (%) Processing Centre | Cost Difference (%) |
|---|---|---|---|---|
| P-500-25-5 | 0 | 0.00 | 0.00 | 0.00 |
|  | 2.5 | 1.80 | 2.00 | 0.54 |
|  | 5 | 5.40 | 3.20 | 0.81 |
|  | 7.5 | 8.00 | 6.40 | 1.23 |
|  | 10 | 9.80 | 8.20 | 2.31 |
| P-1000-50-10 | 0 | 0.00 | 0.00 | 0.00 |
|  | 2.5 | 1.60 | 2.50 | 0.24 |
|  | 5 | 3.10 | 5.40 | 0.75 |
|  | 7.5 | 5.90 | 8.60 | 0.75 |
|  | 10 | 9.00 | 11.50 | 1.86 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of data regulations-aware cloud storage and processing service allocation. The present disclosure provides a joint optimization model that caters to optimizing both storage and processing center transfer cost, considering the DR regulations, tiered pricing, and storage budget restriction. This model results in a global optimal solution.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:
   receiving, by one or more hardware processors, an input comprising a resource requirement data pertaining to a plurality of users, a geolocation of each of the plurality of users, a plurality of data storage centers (SCs) and a plurality of processing centers (PCs), wherein the resource requirement data of the users includes data storage and a processing power needed by a User Center (UC) associated with the user;
   obtaining, by the one or more hardware processors, a plurality of data regulations pertaining to each of the plurality of users based on a corresponding geolocation from a data regulation repository, wherein the plurality of data regulations varies according to a type of data including health, finance, personal handled and differs for data storage and processing activities;
   generating, by the one or more hardware processors, a first feasible allocation for each of the plurality of users based on the input and the plurality of data regulations using a minimal transfer cost based optimization technique, wherein the first feasible allocation comprises an SC and a corresponding PC, wherein generating the first feasible allocation for each of the plurality of users based on the input and the plurality of data regulations using the minimal transfer cost based optimization technique comprises:
      identifying a first plurality of feasible SCs and a corresponding plurality of feasible PCs for each of the plurality of users based on a mapping with the plurality of data regulations pertaining to each of the plurality of users;
      allocating the SC, from among the first plurality of feasible SCs, with a transfer cost between a User Center (UC) and SC less than a first predefined threshold, to each of the plurality of users only if (i) a corresponding plurality of data regulations are satisfied (ii) data size of a corresponding UC is less than a predefined storage capacity of the SC and (iii) data transferred from SC to PC is less than a predefined storage threshold, wherein the predefined storage threshold is a minimum of storage capacity of the plurality of PCs, wherein a total storage cost is computed for each allocated SC; and
      allocating the corresponding PC from among the first plurality of feasible PCs to each allocated SC with a transfer cost between the SC and the corresponding PC less than a second predefined threshold only if (i) the corresponding plurality of data regulations are satisfied and (ii) the data processing capacity of the corresponding PC is less than a predefined processing capacity;
   computing, by the one or more hardware processors, a first transfer cost for each of the plurality of users based on the first feasible allocation, wherein the first transfer cost is a sum of cost to transfer data from UC to SCs and from SCs to PCs based on the first feasible allocation;
   obtaining, by the one or more hardware processors, a second feasible allocation for each of the plurality of users based on the storage cost using a storage cost optimization technique, wherein the storage cost optimization technique iteratively checks set of conditions $u_j \le d_j'(1-p_{jt'}) + M_2 \cdot P_{jt'}$, $\forall j \in S$ & $t \in T$, ensures that when a $(t+1)^{th}$ tier is not selected, the amount of data stored at SC (i) must not go beyond the $t^{th}$ tier data limit, wherein when $(t+1)^{th}$ tier is selected, the amount of data stored at each SC (i) is a positive integer value, therefore a parameter $M_2$ is introduced and value of the parameter $M_2$ is confined by $\Sigma_{i \in U} D_i$,
   whether (i) the storage cost of each allocated SC is less than the storage cost identified in the initial feasible solution, (ii) data regulation criteria is satisfied (iii) storage capacity of each allocated SC is less than the predefined storage capacity and (iv) processing capacity of the PC assigned to the SC is less than the predefined processing capacity wherein the transfer cost, amount of data stored in SCs and PCs are updated in each iteration;
   computing, by the one or more hardware processors, a second transfer cost for each of the plurality of users based on the data and the second feasible solution, wherein the second transfer cost is a sum of cost to transfer data from UC to SCs and from SCs to PCs based on the second feasible allocation;
   computing, by the one or more hardware processors, a difference in transfer cost based on a comparison between the first transfer cost and the second transfer cost;
   generating, by the one or more hardware processors, a storage cost reduction matrix based on the first feasible allocation, the second feasible allocation and the difference in transfer cost;
   generating, by the one or more hardware processors, a plurality of migration pairs for each of the plurality of users based on the storage cost reduction matrix, wherein each of the plurality of migration pairs comprises a current SC where a corresponding UC resides and a new SC where the corresponding UC is to be migrated;
   generating, by the one or more hardware processors, a ranked list by sorting each of the plurality of migration pairs based on decreasing storage cost and the difference in transfer cost using Multi-Criteria Decision Making (MCDM) ranking technique; and
   generating, by the one or more hardware processors, a tier pricing based near-optimal solution for each of the plurality of users by applying a plurality of selection criterion on the ranked list.

2. The processor implemented method of claim 1, wherein the resource requirement data comprises a storage requirement and processing requirement.

3. The processor implemented method of claim 1, wherein the plurality of selection criteria comprises (i) a higher rank based selection (ii) a capacity based selection and (iii) a dependency based selection.

4. The processor implemented method of claim 3, wherein the higher rank based selection selects a migration pair with higher MCDM rank, wherein when a higher ranked pair ($U_i$, $S_{new}$) is selected, then all remaining lower ranked pairs associated with $U_i$ are rejected, as one user is assigned to only one SC.

5. The processor implemented method of claim 3, wherein the capacity based selection selects a migration pair only if allocation do not violate the predefined storage capacity and the predefined processing capacity, wherein a next high ranked pair is ($U_2$, $S_{new}$), the $S_{new}$ is a same storage center where earlier $U_i$ assigned and the migration pair is selected, when a storage capacity of $S_{new}$ and the storage capacity of $P_{old}$ assigned to $S_{new}$ does not exceed.

6. The processor implemented method of claim 3, the dependency based selection selects a current migration pair based on an impact of current migration pair on a plurality of higher ranked migration pairs dependent on the current migration pair, wherein the current migration is selected only if there is any reduction in storage cost on the plurality of higher order migrations dependent on the current migration pair, wherein when the next high ranked pair is (i) ($U_3$, $S_i$)→($U_3$, $S_{old}$) or (ii) ($U_4$, $S_{new}$)→($U_4$, $S_x$), here, $U_3$ is getting migrated to $S_{old}$ and $U_4$ is getting migrated from $S_{new}$.

7. A system comprising:
at least one memory storing programmed instructions; one or more Input/Output (I/O) interfaces; and one or more hardware processors operatively coupled to the at least one memory, wherein the one or more hardware processors are configured by the programmed instructions to:
receive an input comprising a resource requirement data pertaining to a plurality of users, a geolocation of each of the plurality of users, a plurality of data storage centers (SCs) and a plurality of processing centers (PCs), wherein the resource requirement data of the users includes data storage and a processing power needed by a User Center (UC) associated with the user;
obtain a plurality of data regulations pertaining to each of the plurality of users based on a corresponding geolocation from a data regulation repository, wherein the plurality of data regulations varies according to a type of data including health, finance, personal handled and differs for data storage and processing activities;
generate a first feasible allocation for each of the plurality of users based on the input and the plurality of data regulations using a minimal transfer cost based optimization technique, wherein the first feasible allocation comprises an SC and a corresponding PC, wherein generate the first feasible allocation for each of the plurality of users based on the input and the plurality of data regulations using the minimal transfer cost based optimization technique comprises:
identifying a first plurality of feasible SCs and a corresponding plurality of feasible PCs for each of the plurality of users based on a mapping with the plurality of data regulations pertaining to each of the plurality of users;
allocating the SC, from among the first plurality of feasible SCs, with a transfer cost between a User Center (UC) and SC less than a first predefined threshold, to each of the plurality of users only if (i) a corresponding plurality of data regulations are satisfied (ii) data size of a corresponding UC is less than a predefined storage capacity of the SC and (iii) data transferred from SC to PC is less than a predefined storage threshold, wherein the predefined storage threshold is a minimum of storage capacity of the plurality of PCs, wherein a total storage cost is computed for each allocated SC; and allocating the corresponding PC from among the first plurality of feasible PCs to each allocated SC with a transfer cost between the SC and the corresponding PC less than a second predefined threshold only if (i) the corresponding plurality of data regulations are satisfied and (ii) the data processing capacity of the corresponding PC is less than a predefined processing capacity;
compute a first transfer cost for each of the plurality of users based on the first feasible allocation, wherein the first transfer cost is a sum of cost to transfer data from UC to SCs and from SCs to PCs based on the first feasible allocation;
obtain a second feasible allocation for each of the plurality of users based on the storage cost using a storage cost optimization technique, wherein the storage cost optimization technique iteratively checks set of conditions
$u_j \leq d_j^t(1-p_{jt'}) + M_2 \cdot P_{jt'} \forall j \in S$ & $t \in T$, ensures that when a $(t+1)^{th}$ tier is not selected, the amount of data stored at SC (j) must not go beyond the $t^{th}$ tier data limit, wherein when $(t+1)^{th}$ tier is selected, the amount of data stored at each SC (j) is a positive integer value, therefore a parameter $M_2$ is introduced and value of the parameter $M_2$ is confined by $\Sigma_{i \in U} D_i$,
whether (i) the storage cost of each allocated SC is less than the storage cost identified in the initial feasible solution, (ii) data regulation criteria is satisfied (iii) storage capacity of each allocated SC is less than the predefined storage capacity and (iv) processing capacity of the PC assigned to the SC is less than the predefined processing capacity wherein the transfer cost, amount of data stored in SCs and PCs are updated in each iteration;
compute a second transfer cost for each of the plurality of users based on the data and the second feasible solution, wherein the second transfer cost is a sum of cost to transfer data from UC to SCs and from SCs to PCs based on the second feasible allocation;
compute a difference in transfer cost based on a comparison between the first transfer cost and the second transfer cost;
generate a storage cost reduction matrix based on the first feasible allocation, the second feasible allocation and the difference in transfer cost;
generate a plurality of migration pairs for each of the plurality of users based on the storage cost reduction matrix, wherein each of the plurality of migration pairs comprises a current SC where a corresponding UC resides and a new SC where the corresponding UC is to be migrated;
generate a ranked list by sorting each of the plurality of migration pairs based on decreasing storage cost and the difference in transfer cost using Multi-Criteria Decision Making (MCDM) ranking technique; and
generate a tier pricing based near-optimal solution for each of the plurality of users by applying a plurality of selection criterion on the ranked list.

8. The system of claim 7, wherein the resource requirement data comprises a storage requirement and processing requirement.

9. The system of claim 7, wherein the plurality of selection criteria comprises (i) a higher rank based selection (ii) a capacity based selection and (iii) a dependency based selection.

10. The system of claim 9, wherein the higher rank based selection selects a migration pair with higher MCDM rank, wherein when a higher ranked pair ($U_j$, $S_{new}$) is selected, then all remaining lower ranked pairs associated with $U_j$ are rejected, as one user is assigned to only one SC.

11. The system of claim 9, wherein the capacity based selection selects a migration pair only if allocation do not violate the predefined storage capacity and the predefined processing capacity, wherein a next high ranked pair is ($U_2$, $S_{new}$), the $S_{new}$ is a same storage center where earlier $U_i$ assigned and the migration pair is selected, when a storage capacity of $S_{new}$ and the storage capacity of Pola assigned to $S_{new}$ does not exceed.

12. The system of claim 9, the dependency based selection selects a current migration pair based on an impact of current migration pair on a plurality of higher ranked migration pairs dependent on the current migration pair, wherein the current migration is selected only if there is any reduction in storage cost on the plurality of higher order migrations dependent on the current migration pair, wherein when the next high ranked pair is (i) ($U_3$, $S_j$)→($U_3$, $S_{old}$) or (ii) ($U_4$, $S_{new}$)→($U_4$, $S_x$), here, $U_3$ is getting migrated to $S_{old}$ and $U_4$ is getting migrated from $S_{new}$.

13. One or more non-transitory machine-readable information storage mediums comprising one or more instructions which when executed by one or more hardware processors cause:

receiving an input comprising a resource requirement data pertaining to a plurality of users, a geolocation of each of the plurality of users, a plurality of data storage centers (SCs) and a plurality of processing centers (PCs), wherein the resource requirement data of the users includes data storage and a processing power needed by a User Center (UC) associated with the user;

obtaining a plurality of data regulations pertaining to each of the plurality of users based on a corresponding geolocation from a data regulation repository, wherein the plurality of data regulations varies according to a type of data including health, finance, personal handled and differs for data storage and processing activities;

generating a first feasible allocation for each of the plurality of users based on the input and the plurality of data regulations using a minimal transfer cost based optimization technique, wherein the first feasible allocation comprises an SC and a corresponding PC, wherein generating the first feasible allocation for each of the plurality of users based on the input and the plurality of data regulations using the minimal transfer cost based optimization technique comprises:

identifying a first plurality of feasible SCs and a corresponding plurality of feasible PCs for each of the plurality of users based on a mapping with the plurality of data regulations pertaining to each of the plurality of users;

allocating the SC, from among the first plurality of feasible SCs, with a transfer cost between a User Center (UC) and SC less than a first predefined threshold, to each of the plurality of users only if (i) a corresponding plurality of data regulations are satisfied (ii) data size of a corresponding UC is less than a predefined storage capacity of the SC and (iii) data transferred from SC to PC is less than a predefined storage threshold, wherein the predefined storage threshold is a minimum of storage capacity of the plurality of PCs, wherein a total storage cost is computed for each allocated SC; and allocating the corresponding PC from among the first plurality of feasible PCs to each allocated SC with a transfer cost between the SC and the corresponding PC less than a second predefined threshold only if (i) the corresponding plurality of data regulations are satisfied and (ii) the data processing capacity of the corresponding PC is less than a predefined processing capacity;

computing a first transfer cost for each of the plurality of users based on the first feasible allocation, wherein the first transfer cost is a sum of cost to transfer data from UC to SCs and from SCs to PCs based on the first feasible allocation;

obtaining a second feasible allocation for each of the plurality of users based on the storage cost using a storage cost optimization technique, wherein the storage cost optimization technique iteratively checks set of conditions $u_j \leq d_j^t(1-p_{jt'}) + M_2 \cdot p_{jt'} \forall Vj \in S \& t \in T$, ensures that when a $(t+1)^{th}$ tier is not selected, the amount of data stored at SC (j) must not go beyond the $t^{th}$ tier data limit, wherein when $(t+1)^{th}$ tier is selected, the amount of data stored at each SC (j) is a positive integer value, therefore a parameter $M_2$ is introduced and value of the parameter $M_2$ is confined by $\Sigma_{i \in U} D_i$, whether (i) the storage cost of each allocated SC is less than the storage cost identified in the initial feasible solution, (ii) data regulation criteria is satisfied (iii) storage capacity of each allocated SC is less than the predefined storage capacity and (iv) processing capacity of the PC assigned to the SC is less than the predefined processing capacity wherein the transfer cost, amount of data stored in SCs and PCs are updated in each iteration;

computing a second transfer cost for each of the plurality of users based on the data and the second feasible solution, wherein the second transfer cost is a sum of cost to transfer data from UC to SCs and from SCs to PCs based on the second feasible allocation;

computing a difference in transfer cost based on a comparison between the first transfer cost and the second transfer cost;

generating a storage cost reduction matrix based on the first feasible allocation, the second feasible allocation and the difference in transfer cost;

generating a plurality of migration pairs for each of the plurality of users based on the storage cost reduction matrix, wherein each of the plurality of migration pairs comprises a current SC where a corresponding UC resides and a new SC where the corresponding UC is to be migrated;

generating a ranked list by sorting each of the plurality of migration pairs based on decreasing storage cost and the difference in transfer cost using Multi-Criteria Decision Making (MCDM) ranking technique; and generating a tier pricing based near-optimal solution for each of the plurality of users by applying a plurality of selection criterion on the ranked list.

14. The one or more non-transitory machine-readable information storage mediums of claim 13, wherein the resource requirement data comprises a storage requirement and processing requirement.

* * * * *